Jan. 23, 1951  S. GILBERT  2,538,866
SEAL FOR ENGINE STARTERS
Filed May 21, 1946
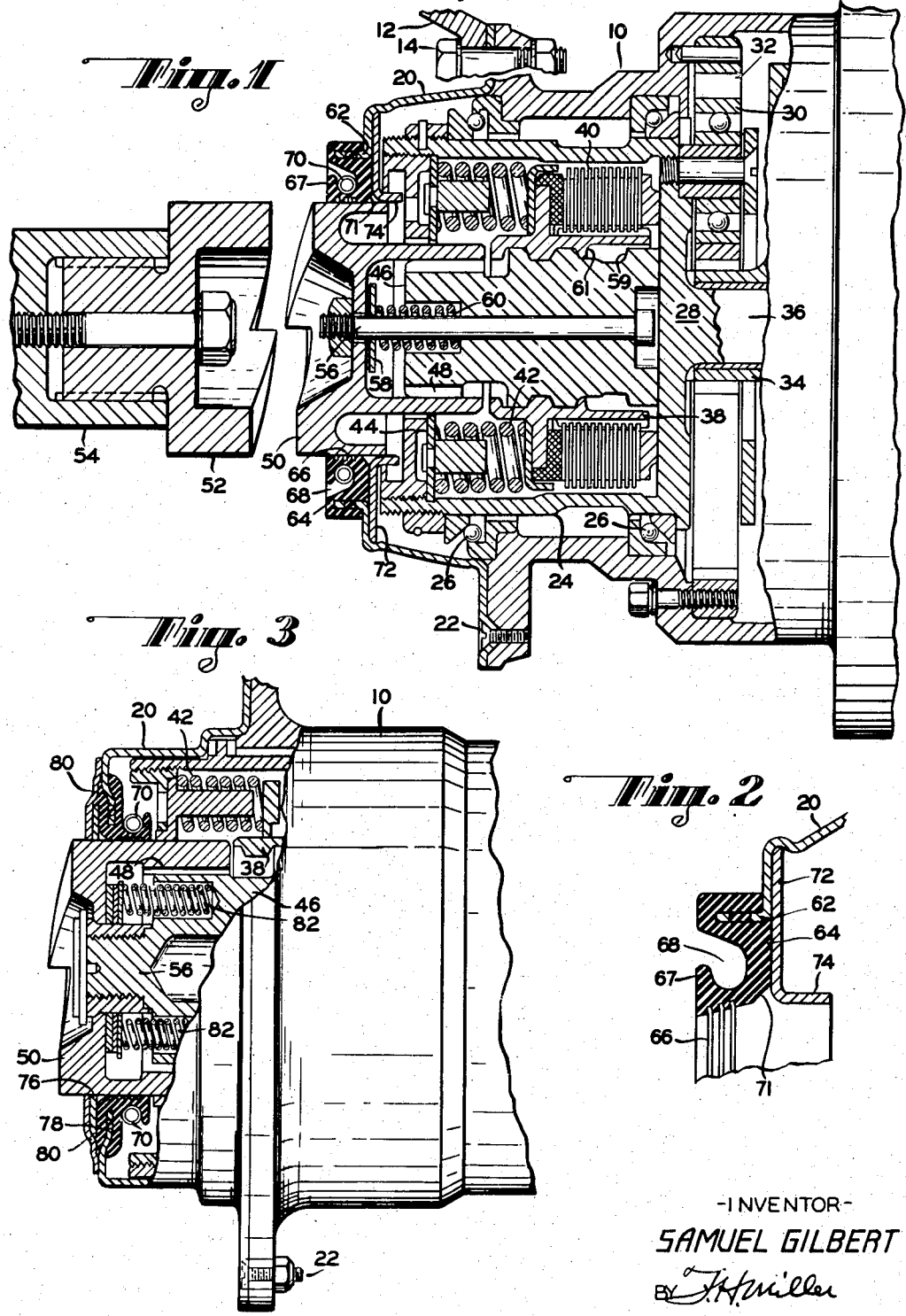
-INVENTOR-
SAMUEL GILBERT
By J.H. Miller
-ATTORNEY- Patented Jan. 23, 1951

2,538,866

UNITED STATES PATENT OFFICE 2,538,866

SEAL FOR ENGINE STARTERS

Samuel Gilbert, Cedar Grove, N. J., assignor to Bendix Aviation Corporation, Teterboro, N. J., a corporation of Delaware Application May 21, 1946, Serial No. 671,263

1 Claim. (Cl. 286—5)

This invention relates to engine starters, and particularly to improvements in and about a starter clutch or jaw member, the frictional holding of the clutch member for movement into engagement with an engine clutch or jaw element, and its fluid sealing relative to the starter casing.

A starter of a certain type may contain a dry or wet disc clutch inside the starter casing, which should be protected from oil. It is usual, in such starter, to have a main starter clutch jaw member at the exterior of one end of the starter casing for engagement with a clutch jaw element in the engine crank case, and to place such end of the starter in an adjacent end of the crank case.

This feature subjects the starter to an unusually severe sealing problem, since the starter clutch member not only moves axially in an opening of the starter casing for engagement to, and disengagement from, the engine clutch element, but also rotates in such opening to start the engine.

The starter comprises an axially stationary spline nut rotatively driven through the disc clutch, and a screw shaft in the nut splined to the starter clutch member. The latter is frictionally held so that, when the nut starts to rotate, it first moves the screw shaft longitudinally from an initial position, which similarly moves the starter clutch member through the intermediary of a spring. When the clutch member engages the engine clutch element, during which it may compress the aforenoted spring, the screw shaft is rotatively driven by the spline nut to crank the engine.

The means for frictionally holding the starter clutch member as aforesaid has also been a difficult problem, and although closely associated structurally with the sealing means, has been a separate problem and a separate structural entity.

Accordingly, it is among the objects of the present invention to provide a unit or single means to take the place of the heretofore separate friction providing and fluid sealing means for the starter main clutch or jaw member.

Another object is to adapt friction means to impose its friction effect directly on the engine engaging starter clutch means.

Another object is to provide a selection of means for preventing vibration of the starter clutch member, either in the retracted position only of the member or during all of its movement to augment the friction of the above-mentioned sealing means, and to embody the vibration preventing means as part of the friction seal unit.

Another object is to more effectively seal the starter casing against the ingress of oil, as by means including a tubular sealing element, which surrounds and extends along the starter clutch member radially inwardly resiliently biased thereagainst, and in one form projects axially outwardly of the starter, to wipe the oil from the member during the strokes of the latter longitudinally inwardly of the starter, and to facilitate mounting of the element over the outer end of the clutch member during assembly.

Another object is to provide the above-mentioned unit with a labyrinth of inner peripheral grooves whereby to augment its frictional and sealing effects.

Another object is to provide novel means for the aforesaid friction or sealing means wherein a yieldable element, which is adapted for compression in a starter end closure member, surrounds, and has a groove surrounding, the clutch member, the entrance to which groove adapts the groove to receive a garter spring before such compression and is contracted after the compression to prevent displacement of the spring.

Another object is to provide a unit of the above mentioned character that is simple and durable in construction, economical to manufacture, and effective in its operation.

The above and other objects and features of the invention will appear more fully herein from a consideration of the following description taken in connection with the accompanying drawing wherein three embodiments of the invention are illustrated by way of example.

In the drawing:

Figure 1 is a side view, partially in elevation and partially in section of a portion of an engine starter embodying the invention in one form;

Figure 2 is a detail view of a portion of Figure 1, showing a friction providing fluid seal element in a condition thereof before being mounted as in Figure 1, as will appear; and Figure 3 is a view similar to Figure 1, showing the invention in modified form.

In Figure 1, which illustrates only a portion of the starter sufficient for an understanding of the invention, the structure comprises, in general, an inner casing portion 10 secured at one end to an engine crank case 12, as by bolts 14. An end member 20 has a flange secured to the portion 10, as by screws or bolts 22, and held by the bolts 14 between the portion 10 and the case 12.

A barrel 24, rotatably journaled in bearings 26, has an end wall 28 constituting a spider for supporting planet gears 30 operating between an orbital gear 32, fixed to the casing portion 10, and a sun gear 34, which is driven in a usual manner by a motor through further speed reducing means, and is journaled on a trunnion portion 36 of the end wall 28 of the barrel 24.

A spline nut 38 is connected to the barrel 24 therein by a disc pack clutch 40 having interlayered discs fixed to the nut 38 and the barrel 24, respectively, and axially biased together by springs 42 held in adjusted relation to each other, as by a ring 44 screw threaded in the opposite end of the barrel 24.

A screw shaft 46, having wide pitch screw thread connection to the spline nut 38 therein, has an axially slidable spline connection 48 to a starter clutch jaw member 50, which is adapted to engage an engine jaw clutch element 52 on an engine shaft 54.

The member 50 and the shaft 46 are connected, in this instance, by a mesh rod 55 extending through an aperture in the member 50, which aperture is closed by a seal 58 biased against the member 50 by a spring 60 extending into the screw shaft 46.

The screw shaft 46 is limited in its right hand axial movement, as viewed in the drawing, by engagement with the barrel end wall 28, and, in its left hand axial movement, by engagement of a shoulder 59 on the shaft with a shoulder 61 on the spline nut 38.

The unit of the invention comprises the end member 20, of which an axially extending annular flange 62 is provided with apertures spaced from each other around the flange and constituting anchoring means for a yieldable ring-like or tubular body or portion 64 of material of good friction and fluid sealing characteristics and resistant to oil, such as neoprene or the like.

The body 64 is molded in position on the flange 62, with portions of the body at the inner and outer sides of the flange connected to each other around the outer edge and through the aforesaid apertures, and secured in position by vulcanization.

The body 64 further comprises a labyrinth of inner peripheral grooves 66, and an annular channel or groove 68, the entrance to which, as shown in Figure 2, is of sufficient width, by slight flexure of an entrance lip 67 before compressing the body in the member 20, to readily receive a garter spring 70, Figure 1, for biasing the tubular portion of the body 64, radially inwardly of the spring, against the outer periphery of the clutch member 50. As shown in Figure 1, after the body 64 is sprung or contracted in the member 20, by placing the member 50 therein, the entrance to the groove 68 is so reduced in width as to effectively prevent displacement of the spring 70 or portions thereof from the groove 68.

In the above-described structure, that portion of the body 64 to the right of the channel 68, as viewed in the drawing, constitutes a base, from which the tubular portion under the spring 70, and having the labyrinth of grooves, extends in the direction of the outward axial movement or stroke of the clutch member 50, whereby the sharp outer edge of such tubular portion, next to the member 50, and the sharp edges defining the grooves 66 wipe the oil from the member 50 on its inward or return stroke.

The arrangement, whereby the tubular portion of the body 64 faces the crank case 12, and the spring 70, the lip 67 and the labyrinth of grooves 66 are located as shown, more effectively prevents the ingress of oil from the crank case to the starter casing, and protects the engine from damage in case of breakage of the spring 70 which, if allowed to fall into the crank case might be further broken up, as by the engine timing gears, to be carried by the oil into the bearings, cylinders or other places in which damage might result.

Also, the tubular portion under the spring 70 is defined at the right by a sloping surface 71, whereby the forces from the spring are more closely confined to, and uniformly distributed in, the tubular portion having the labyrinth of grooves 66 and the outer edge for more effectively wiping the oil from the member 50 as aforesaid.

The body 64 is backed by a ring-like member 72 having a tubular portion or flange 74 extending away from the body and adapted to receive and closely fit the clutch or jaw member 50 at its inner or normally stationary position, whereby to prevent radial vibration of the clutch member. Such vibration, if allowed to occur, would be transmitted to the body 64 to shorten the useful life of the body, and of other associated parts.

In operation, when the sun gear 34 is rotatably driven, it turns the planet gears 30, which, since they are carried by the barrel 24 and are in mesh with the fixed orbital gear 32, react to turn the barrel 24, which turns the spline nut 38 through the intermediary of the disc clutch 40.

With the screw shaft 46 splined by the connection 48 to the clutch member 50, and the latter engaged by the body 64 of the combined oil seal and friction unit, the first turning of the barrel 24 and the spline nut 38 causes the screw shaft 46 to advance to the left from the position shown to engage the member 50 to the engine element 52, subsequent to which, with the shoulder 59 in engagement with the shoulder 61, the member 50 drives the element 52 and the engine shaft 54 to normally start the engine.

When the engine starts, the element 52 thereof overrides the starter jaw member 50, and when the starter motor is deenergized, the element 52 cams the member 50 in a usual manner back to the position indicated. If the engine shaft for any reason abnormally resists turning, or if the engine backfires, the reaction is absorbed in the starter by the disc clutch 40.

Referring to Figure 3, in which corresponding parts are designated by corresponding reference numerals, the construction and operation are similar to those above described, with exceptions, such as the direction in which a body 78 similar to the body 64 extends along the longer friction sealing surface of the jaw member 50, a split ring like member 76 of material, such as phosphor bronze, which not only prevents the above-mentioned vibration, but also augments the friction of the body 78, a groove in the body 78 which opens radially for the reception of the spring 70, and a member 80 for holding the member 76 relative to the body 78 for spring action against the starter clutch member.

Other exceptions, not germane to the invention, reside in the number and form of parts, such as plurality of springs 82 instead of the single spring 60.

Various other modifications of the structure are contemplated, such as the omission of the member 76 in certain installations, and the provision of a plurality of the garter springs 70, with a corresponding number of grooves for receiving these springs where desired.

Although several embodiments of the invention have been illustrated and described, various changes in the form and relative arrangements of the parts may be made to suit requirements.

What is claimed is:

For use in an engine starter of the class including a casing having a front end opening, and a clutch member extending through said opening and adapted to be held against rotation for axial movement forwardly of the casing to engage an engine clutch element and to be rotated to start the engine, the improvement comprising an annular L-section sheet-metal end portion of said casing around said opening, a front leg of which section extends along the clutch member with its free edge forwardly of the casing and is provided with through apertures peripherally spaced from each other, a ring-like member of soft rubber or like material around said opening having portions at opposite sides of said front leg joined and vulcanized to each other by portions of the material in said apertures and around said free edge, said ring-like member including a front-face annular groove and a radially-inner clutch-member-engaging annular surface which, prior to assembly on the clutch member, converges forwardly with said groove fully open, and a garter spring adapted for placement in said fully open groove, the ring-like member operating when thrust axially over the front end of the clutch member to move the groove sides relatively toward the spring to a closed position preventing displacement of the spring from the groove.

SAMUEL GILBERT.

REFERENCES CITED

The following references are of record in the file of this patent:

UNITED STATES PATENTS

| Number | Name | Date |
|---|---|---|
| 2,008,682 | Christensen | July 23, 1935 |
| 2,145,928 | Heinze et al. | Feb. 7, 1939 |
| 2,264,062 | Wilkes | Nov. 25, 1941 |
| 2,412,829 | Nardone | Dec. 17, 1946 |

FOREIGN PATENTS

| Number | Country | Date |
|---|---|---|
| 556,441 | Great Britain | of 1943 |
| 876,866 | France | of 1942 |